US009552394B2

(12) United States Patent
Gopinath et al.

(10) Patent No.: US 9,552,394 B2
(45) Date of Patent: *Jan. 24, 2017

(54) GENERATION OF MULTI-FACETED SEARCH RESULTS IN RESPONSE TO QUERY

(71) Applicant: INTERNATIONAL BUSINESS MACHINES CORPORATION, Armonk, NY (US)

(72) Inventors: Divya Gopinath, Clarksburg, MD (US); Gili Mendel, Cary, NC (US); Rajesh Radhakrishnan, Reston, VA (US); Jennifer Ann Watson, Wasaga Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/003,873

(22) Filed: Jan. 22, 2016

(65) Prior Publication Data

US 2016/0154858 A1 Jun. 2, 2016

Related U.S. Application Data

(63) Continuation of application No. 14/661,297, filed on Mar. 18, 2015, now Pat. No. 9,280,606, which is a (Continued)

(51) Int. Cl.
*G06F 17/30* (2006.01)

(52) U.S. Cl.
CPC ... *G06F 17/30528* (2013.01); *G06F 17/30554* (2013.01); *G06F 17/30672* (2013.01); (Continued)

(58) Field of Classification Search
None
See application file for complete search history.

(56) References Cited

U.S. PATENT DOCUMENTS

| 7,548,909 B2 | 6/2009 | Rappaport et al. |
| 7,747,626 B2 | 6/2010 | Grimm et al. |
| (Continued) | | |

OTHER PUBLICATIONS

U.S. Appl. No. 14/661,297, filed Mar. 18, 2015; Confirmation No. 5589.

*Primary Examiner* — Anh Tai Tran
(74) *Attorney, Agent, or Firm* — Patrick J. Daugherty; Driggs, Hogg, Daugherty & Del Zoppo Co., LPA (57) ABSTRACT

Aspects retrieve, organize and display different classifications of sets of search results in different, respective tabbed sheets that are nested on top of one another in a web-based interface dashboard. A text string search query is classified into constituent primary search terms that are likely to return satisfactory search results as indicated by retrieved search history data as a function of search resources and language classification rules associated with the user identity indicia. Secondary search terms related to the primary search terms and including synonyms and antonyms are determined as substitutes for the primary search terms in response to search history indicating follow-up searches immediately subsequent to searches of the primary search terms at less than a specified threshold of frequency. The set of peripheral knowledge article results is generated by searching knowledge article resources for background information on the primary search terms or the secondary search terms.

20 Claims, 3 Drawing Sheets

Related U.S. Application Data continuation of application No. 13/872,193, filed on Apr. 29, 2013, now Pat. No. 9,020,932.

(52) U.S. Cl.
CPC .. *G06F 17/30696* (2013.01); *G06F 17/30705* (2013.01); *G06F 17/30864* (2013.01); *G06F 17/30876* (2013.01)

(56) References Cited

U.S. PATENT DOCUMENTS

| | | |
|---|---|---|
| 8,214,345 B2 | 7/2012 | Torres et al. |
| 9,020,932 B2 | 4/2015 | Gopinath et al. |
| 2004/0186828 A1* | 9/2004 | Yadav et al. .................... 707/3 |
| 2008/0065237 A1 | 3/2008 | Long |
| 2009/0240685 A1* | 9/2009 | Costello et al. ................ 707/5 |

* cited by examiner

GENERATION OF MULTI-FACETED SEARCH RESULTS IN RESPONSE TO QUERY

FIELD OF THE INVENTION

The present invention relates to the use of data analysis and internet analytics in the retrieval of a plurality of results and related items in response to a search query.

BACKGROUND

Search engines enable individuals to retrieve a wide variety of items from a wide variety of resources in response to a simple text query applied to a single computer system storage device, or to a plurality of networked storage devices and systems, such as via a Local Area Network (LAN) and the Internet (also known as the "World-Wide Web"). However, determining and selecting an appropriate or satisfactory result from a given text inquiry may be difficult. Generally, a plurality of individual, specific responses are returned that are oriented to satisfy a question expressed or implied by the text query, wherein the query may not accurately specify the nature or extent of the information sought. Often a user must enter further, additional searches to revise the results returned, sometimes asking a series of questions related to the original search to get more information. The quality of the information collected during a series of related searches relies on the quality of the questions that the individual searcher composes and submits. While a series of searches and follow-on queries may eventually return satisfactory results, the search results might also omit better or more satisfactory information if the individual does not use correct terms, or does not know enough about a topic to compose an appropriate search string.

BRIEF SUMMARY

In one aspect of the present invention, a method for retrieving, organizing and displaying multiple-faceted results in response to a text string query includes a processing unit retrieving search history data stored in a data repository in response to determining that the search history data is relevant to identity indicia of a user associated with a text string search query. The processing unit further identifies search resources that are associated with the user identity indicia, and a language classification rule of a language indicated by the user identity indicia. The text string search query is classified into constituent primary search terms that are likely to return satisfactory search results in response to a single search as indicated by the retrieved search history data as a function of the identified search resources that are associated with the user identity indicia and the identified language classification rule, wherein the constituent primary search terms are words or phrases. Secondary search terms that include synonyms and antonyms of the primary search terms are determined as substitutes for the primary search terms, wherein the secondary search terms are related to the primary search terms and are searched in the retrieved search history in follow-up searches that are immediately subsequent to searches of the primary search terms at a frequency that is less than a specified threshold of frequency. A primary set of search results is generated in response to searching network resources for the primary search terms, a secondary set of search results is generated in response to searching the network resources for the secondary search terms, and a set of peripheral knowledge article results is generated by searching knowledge article resources for background information on the primary search terms or the secondary search terms. The respective sets of the primary, secondary and peripheral knowledge article search results are displayed to the user in different, respective tabbed sheets that are nested on top of one another in a web-based interface dashboard.

In another aspect, a system has a processing unit, computer readable memory and a tangible computer-readable storage medium with program instructions, wherein the processing unit, when executing the stored program instructions, retrieves search history data stored in a data repository in response to determining that the search history data is relevant to identity indicia of a user associated with a text string search query. The processing unit further identifies search resources that are associated with the user identity indicia, and a language classification rule of a language indicated by the user identity indicia. The text string search query is classified into constituent primary search terms that are likely to return satisfactory search results in response to a single search as indicated by the retrieved search history data as a function of the identified search resources that are associated with the user identity indicia and the identified language classification rule, wherein the constituent primary search terms are words or phrases. Secondary search terms that include synonyms and antonyms of the primary search terms are determined as substitutes for the primary search terms, wherein the secondary search terms are related to the primary search terms and are searched in the retrieved search history in follow-up searches that are immediately subsequent to searches of the primary search terms at a frequency that is less than a specified threshold of frequency. A primary set of search results is generated in response to searching network resources for the primary search terms, a secondary set of search results is generated in response to searching the network resources for the secondary search terms, and a set of peripheral knowledge article results is generated by searching knowledge article resources for background information on the primary search terms or the secondary search terms. The respective sets of the primary, secondary and peripheral knowledge article search results are displayed to the user in different, respective tabbed sheets that are nested on top of one another in a web-based interface dashboard.

In another aspect, a computer program product has a tangible computer-readable storage medium with computer readable program code embodied therewith, the computer readable program code including instructions that, when executed by a computer processing unit, cause the computer processing unit to retrieve search history data stored in a data repository in response to determining that the search history data is relevant to identity indicia of a user associated with a text string search query. The processing unit further identifies search resources that are associated with the user identity indicia, and a language classification rule of a language indicated by the user identity indicia. The text string search query is classified into constituent primary search terms that are likely to return satisfactory search results in response to a single search as indicated by the retrieved search history data as a function of the identified search resources that are associated with the user identity indicia and the identified language classification rule, wherein the constituent primary search terms are words or phrases. Secondary search terms that include synonyms and antonyms of the primary search terms are determined as substitutes for the primary search terms, wherein the secondary search terms are related to the primary search terms and are searched in the retrieved search history in follow-up searches that are immediately subsequent to searches of the primary search terms at a frequency that is less than a specified threshold of frequency. A primary set of search results is generated in response to searching network resources for the primary search terms, a secondary set of search results is generated in response to searching the network resources for the secondary search terms, and a set of peripheral knowledge article results is generated by searching knowledge article resources for background information on the primary search terms or the secondary search terms. The respective sets of the primary, secondary and peripheral knowledge article search results are displayed to the user in different, respective tabbed sheets that are nested on top of one another in a web-based interface dashboard.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical aspects, examples and embodiments of the invention, and therefore should not be considered as limiting the scope of the invention. In the drawings, like numbering represents like elements.

DETAILED DESCRIPTION

Figure 1:
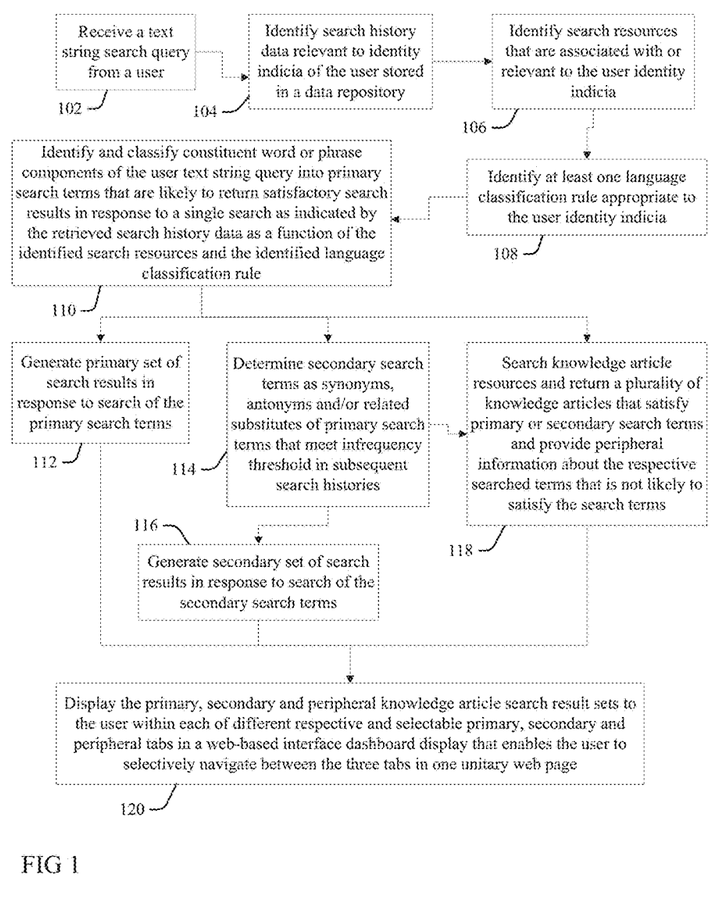
FIG. 1 is a block diagram illustration of a method, system or process for retrieving, organizing and displaying multi-faceted results in response to a text string query according to the present invention.

FIG. 1 illustrates a method, system or process for retrieving, organizing and displaying multiple-faceted results in response to a text string query. At 102 a processing unit executing instructions in a computer system receives a text string search query from a user; at 104 responsively identifies search history data that is relevant to identity indicia of the user and stored in a data repository. The retrieved search history data includes unique user search history data that is associated with identity indicia that is unique to the user, and generic search data that is associated with occupational identity indicia that is common to the user and at least one other user having the same occupational identity indicia.

At 106 search resources are identified as associated with or relevant to the user identity indicia. At 108 one or more language classification rules of a language indicated by the user identity indicia are identified.

At 110 constituent word or phrase components of the user's text string query are individually identified and classified into primary search terms as a function of the search history data determined relevant to the user identity indicia at 104, the search resources associated with the user identity indicia at 106, and the appropriate language classification identified at 108. Primary search terms may be defined as terms that are likely to return satisfactory search results in response to a single search, as indicated by historical search data. More particularly, an internet browser search of a primary term generates a plurality of results, wherein historical search data indicates that one or more of the displayed results is selected as a satisfactory result, which is indicated by a termination of searching after selection of the satisfactory term. Termination of searching may be defined by a variety of methods, including recognizing a closing of the search browser application, or idleness of the browser for a specified time (for example, more than ten seconds, or thirty seconds, or two minutes, or some other time appropriate period useful in indicating the termination of searching activities.

Thus, at 110 the components of the user's text string query are classified into individual key words; key word phrases or questions formed by multiple key words; individual, simple entities (objects, things, items, persons, etc.) defined by word components within the string; or complex entities that comprehend and are described by multiple entity or key word terms within the string, wherein the classified items match or satisfy previous search components found in the identified search histories and/or the identified resources, or meet specifications and conditions of the appropriate language classification rules.

More particularly, the relevant search history data at 104, search resources at 106, and appropriate language classification rules identified at 108 are found via association with unique identity indicia that is specific to the individual user, such as a full name unique to only that user, user account and identification numbers unique to only one user, log-in and password combinations for a given, single user, a job title, etc. Said relevant search history data, search resources and appropriate language classification rules may also be found via association with user identity indicia that is generic to more than one user, such as a last or family name, group name within an organization (for example, a department within a university or a corporate environment), or generic occupational indicia (for example, physician, police officer, legal assistant, attorney, type of engineer, technician in an identified field, etc.) Thus, along with the individual, unique search history of a user, historical data indicative of most popular search terms and resources consulted by other users having the same occupation, within a common demographic category generic to pluralities of other users (age bracket, type of university or declared major, etc.) may be found and applied to classify the string query terms into primary search term components.

The type and location of the user network access may also be considered to find the appropriate histories, resources and rules at 104, 106 and 108. Thus, recognizing that entry of the search string at 102 is via a secure network community portal via a specific domain name that allows medical practitioners (for example, doctors, surgeons, anesthesiologists, etc.) indicates that medical practitioners are the predominant occupational identity associated with the recognized domain name. Accordingly, search histories common to pluralities of users that share the determined predominant occupational identity are retrieved and used as the generic occupational identity search data in aspects of the present invention. This indicates that satisfaction of the primary search terms should comprise a search for medical practices and procedures, and this may further indicate that the components of the query are likely to be entities and key words related to treatment practices and procedures: for example, they include names that match practitioners' medical devices or medicines (entities) within database resources in the same medical field.

In another aspect, industry-specific Internet Content Adaptation Protocol (ICAP) content may be used to recognize user employment or organizational identity indicia. ICAP is a lightweight protocol used to extend transparent proxy servers to provide object-based content via networked Hypertext Transfer Protocol (HTTP) services. Management ICAP content comprehends internal (company) and external (industry) sources, and includes management studies and study results, specific publication archives, project archives, and still other resources identified as appropriate to the management domain at 106 will be apparent to one skilled in the art.

Search strings may be classified into primary search term key words and phrases and entities at 110 by matching search string components to search result content found in content management systems associated with the user identity indicia, including Enterprise Content Management (ECM) software applications and knowledge management systems that have access to formal references (for example, published journals, publications, books, conference proceedings, etc.), informal references (for example, draft presentations, draft speeches, notes, etc.), and other organizational information sources. Entity searches may be matched or linked to product databases, directories of practitioners or other people, and other sources sharing common generic identity indicia with the user. Some aspects may be specialized for designated groups such as cardiologists or pediatricians, etc., and thereby configured to return results that are more likely useful to the user relative to other resources that are more non-specific. Aspects may also recognize an organization associated with the user or the domain used by the user to submit the query, for example identifying that the query comes from a school of materials engineering within a university. The user may be identified as submitting the query via a redirect from a medical search domain at 106, and therefore as someone likely to desire general medical information, and further as belonging to a particular hospital via the domain name of the user's account identification.

Aspects of the present invention track and save user search history data during searches initiated by the user and associate the saved history data with different unique and generic identifying criteria of the users. This enables use of the unique user history both for that user, and for others who share generic identity indicia with the user, and thus over multiple levels of granularity or species of classification. Thus, at 104 the processing unit searches for search histories and rules that are associated with generic indicia of the user, such as occupation, employing organization, departmental assignment within an organization, etc. For example, a user may be identified at 106 as a health care worker, and perhaps further as a doctor, then further as a thoracic surgeon, and still further as a surgeon practicing within pediatrics.

Identifying the constituent string components at 110 includes matching string terms to key words and tangible or intangible entities, items, things, people, and places, etc., found within the relevant resources identified at 106, which may include lists of known people, geographic and addressed places, product names, brands or trademarks. Identified resources may include specialized dictionaries, thesauruses, directories and other databases (for example, medical, legal, etc.), rather than relying on general and popular resources applied to all user searches as is common in the prior art. Thus, aspects of the present invention may be more likely to return, or to more quickly return, a match to an esoteric term found in a specialized resource associated with an occupation identity indicia of the user at 106, wherein a search of more generic and general resources may not find the match.

The appropriate language classification rules are identified as appropriate to the language of the user identity indicia at 108 and may be specific to the user (using the indicated language of the user), or generic to many users sharing common identifying indicia (for example, using a Latin language classification rule if Latin terms are identified within the query string and the user is a physician). Natural language processing (NLP) rules may be identified for application at 108 that use co-reference resolution policies to determine which words ("mentions") refer to the same objects ("entities") within a search string of at least a sentence length. In some examples, anaphora resolutions matches up pronouns with the nouns or names that they refer to within the search string based on determining bridging relationships between different component words: for example, in the sentence "He entered John's house through the front door", "the front door" is identified as a referring expression, wherein an anaphora resolution rule determines that the door being referred to is the front door of John's house (rather than of some other structure). Named entity recognition (NER) rules may use capitalization to recognize named entities in the string term, for example as indicated by an English language classification rule selected at 108 in response to user identity indicia indicating that the user is an English speaker. Still other rules may be identified and applied to break down the search string into nouns, pronouns, verbs and adjectives as will be appreciated by one skilled in the art.

In some aspects, identification and classification of the constituent components of the search string into primary search terms at 110 weights result indications from different functions and selects the highest weighted identification and classification for each of the constituent components. In one example, a (first) classification or identification of a word determined as a function of the user's personal and unique user search history identified at 104 is weighted more highly than another (second, different) classification or identification of the word generated by application of a generic search history identified at 104 as relevant to an occupation of the user, and which is in turn weighted more highly than a third classification or identification of the word generated by application of general, universal search history popularities.

At 112 the processing unit generates a primary set of search results in response to searching network resources for the primary search terms identified and classified at 110. The primary set of results generally includes search results that satisfy a search for the constituent word or phrase components, for example answers strings that are specific to and satisfy question phrase components, or specific entities that match an entity component identified within the user query.

At 114 the processing unit determines secondary search terms that include synonyms, antonyms and related substitute search terms. Said related substitute terms are identified as related to or suggested by searches of the primary search terms, but which are infrequently searched in follow-up searching histories. At 116 a secondary set of search results is generated in response to a search of the secondary search terms that satisfy the determined secondary search terms but not of the constituent query word or phrase components of the primary search terms.

Search histories are applied at 114 to identify secondary terms as related or substitute terms for the primary terms that are themselves infrequently searched in subsequent search iterations instigated by users. In some aspects, a threshold infrequency threshold is applied, for example if no more than 20% of users select a term that is identified at 114 as related to or in substitution of a primary search term for a subsequent search iteration that immediately follows a search for said primary term, than the said substitute or related term qualifies as a secondary search term. (Other thresholds may be applied, and the 20% is provided for illustrative but not exhaustive purposes.) Aspects of the present invention may thereby anticipate related key word questions or queries by an end user and use said anticipated key word questions or queries to generate search results, but further categorize such results as secondary results at 116 in response to the low probability that will satisfy the user (as indicated by the search history data). Aspects thereby improve search efficiencies by obviating the need for the user to manually enter such secondary terms in further search iterations, automatically searching the terms and generating the results, but while keeping said results classified as secondary and thereby separable from the primary results. In one example, "tricycles" is identified as a secondary search term substitute at 114 for "bicycles" as a primary term, in response to determining that tricycles is a related term (it is frequently found in references in common with the term bicycle, and both are personal wheeled vehicles), but wherein tricycle is searched immediately after searching bicycle less than 20% of the time in the user or generic search history data.

Related substitute terms may be determined at 114 by applying the resources identified at 106 as appropriate to the user identity indicia. For example, application of medical dictionary and protocol resources identified at 106 as appropriate to a medical professional user may indicate that "pediatrics" is related to a primary search term "neonatology" via a parent-child relationship, wherein pediatrics is the more general parent term that encompasses "neonatology". However, less than 20% of medical professional search histories indicate a search for "pediatrics" subsequent to a search for "neonatology," and therefore search results generated to satisfy "pediatrics" are likely to be too general or off-point from satisfying a query regarding "neonatology", and said results are more properly classified as secondary results at 116.

In another example, a secondary, a related key word search term "nasal irrigation for sinusitis" is indicated at 114 from a primary search term key word phrase "antibiotics for sinusitis" by identifying a causal relationship between the phrases via application of medical dictionary and protocol resources. Said medical resources may be selected in response to a user search history at 104, to identity indicia at 106 indicating the user is a medical service provider or has submitted the query from a medical organization domain name, or by recognizing the meanings of the constituent phrase terms via application of dictionary or other resources at 110. In another example, a primary search term "ulcer" indicates at 114 a secondary search term of "H Pylori" as a causal agent of "ulcer" as a the primary term. In another example, secondary phrase examples generated at 114 from the constituent query phrase "sinusitis antibiotic" include "antitoxin for antibiotic," and "sinusitis as side effect of medication".

Complementary secondary search term entities may also be determined at 114, for example identifying that "bicycle helmet" and "knee guard" are entities complementary to each other with respect to the primary search term "bicycles" within reference material found relevant to the user identity at 106, but wherein the search histories identified at 104 show infrequent usage in follow-on searching.

In some aspects, the analysis finds secondary search terms at 114 as a function of entity relationships. For example, for a constituent person entity identified at 110, related familial entities such as a spouse, parent, child, etc., may be identified as secondary search entities at 114. Business relationships may also be observed and used; thus, for a primary search book item the author or publisher may be identified as a secondary search entity. For a manufactured entity primary search term (for example, automobile, toy, etc.), the manufacturer, distributor or authorized retailer may be returned for secondary searching. Hosting relationships may be observed and used: for example, a primary search term "Airport Mobile Lounge" may be hosted by an "airport terminal" that is useful in a secondary search, or a "conference room" primary search term may indicate a hosting "conference center" as a secondary search entity. Dependency relationships may also be determined and used, for example a "Flight Delay" primary term may be determined to be caused by an "Airport Weather" secondary search term. In another example, a "Guitar String Brand" primary term entity has a parent-child relationship with a secondary search term "Guitar Brand" entity that is compatible with the type and brand of the string brand being primarily searched.

Aspects also determine secondary terms at 114 as synonyms and antonyms of the primary search terms found in dictionary and thesaurus resources that are selected and applied as a function of the identified search history data, search resources, and appropriate language classification rules found via the association(s) with the user identity indicia (at 104, 106 and 108, respectively). Thus, a secondary result generated at 116 may be an answer string that is specific to and satisfies an antonym question phrase generated at 114, but that is likely to be in opposition to or otherwise unsatisfactory in response to a constituent question component searched at 112 that also forms the basis for generation of the antonym question phrase. In one example, the user query input at 102 is "Is plutonium abundant in China?" This is identified and classified at 110 as a primary search term key word query phrase, and searched to generate answer results that satisfy the query at 112. At 114 an antonym, secondary phrase "Is plutonium scarce in China?" is determined as a function of identifying and classifying this input string as a question, by using a thesaurus resource to replace the key word "abundant" with the antonym "scarce", the antonym phrase is searched at 116 to generate secondary results. As the antonym key word "scarce" has a meaning opposite to the meaning of the base keyword "abundant" of the original user input query, the secondary results returned to satisfy the antonym query are unlikely to satisfy the original query phrase input at 102.

A synonym to a primary search term key word or entity may be determined as a secondary search term at 114 when it meets an appropriate threshold indicating that the synonym is infrequency searched in follow-up to the primary search term. In one example, application of thesaurus and dictionary resources at 114 to a primary search term key word search phrase of "sloshed pilot" indicates that a synonym search phrase of "drunken pilot" is infrequently searched in immediately subsequent searches. In another example, for a primary search term key word search phrase of "sinusitis antibiotic," a secondary synonym phrase of "cold and cough" is determined to synonymous but infrequently used in follow-on searches to satisfy the primary search term at 114.

At 118 the processing unit uses the constituent word or phrase components of the user text string query classified and identified at 110, and the synonyms, antonyms and/or related substitutes thereof that are determined at 114, to search knowledge article resources and return a plurality of knowledge articles that provide background or peripheral information about the respective search terms. More particularly, the peripheral information returned at 118 includes knowledge articles, how-to guides, maintenance tips, product manuals, etc., that provide general information about the terms searched at 112 and 114, but which are not likely to directly satisfy user searches of said terms. Determination that a peripheral information item is peripheral to the relevant search terms may be indicated by search histories specific to the user, or by general, global, universal search histories, wherein the histories show that the user or others typically do not select the returned peripheral information items in satisfaction of a search request when other items are also offered in a browser display. Such histories indicate that while the peripheral information results may be relevant, they should be given low priority. In one example, search histories indicate that a search query containing "bicycle air pump" is likely to be satisfied by returning on-line retailer offers of specific bicycle pump models with pricing and sales terms information, and wherein results that describe what a bicycle air pump is or how to use it are less likely to be selected in satisfaction of the query; accordingly, a knowledge article on "How to fix bicycle tire tube punctures" is appropriately returned as a peripheral document at 118, rather than as within the primary set of results at 112.

At 120 the primary, secondary and peripheral search results are displayed to the user submitting the query (at 102) in a web-based interface dashboard display that includes different respective and selectable primary, secondary and peripheral tabs that each include lists of their respective results, and which enables the user to selectively navigate between the three tabs in one unitary web page.

Figure 2:
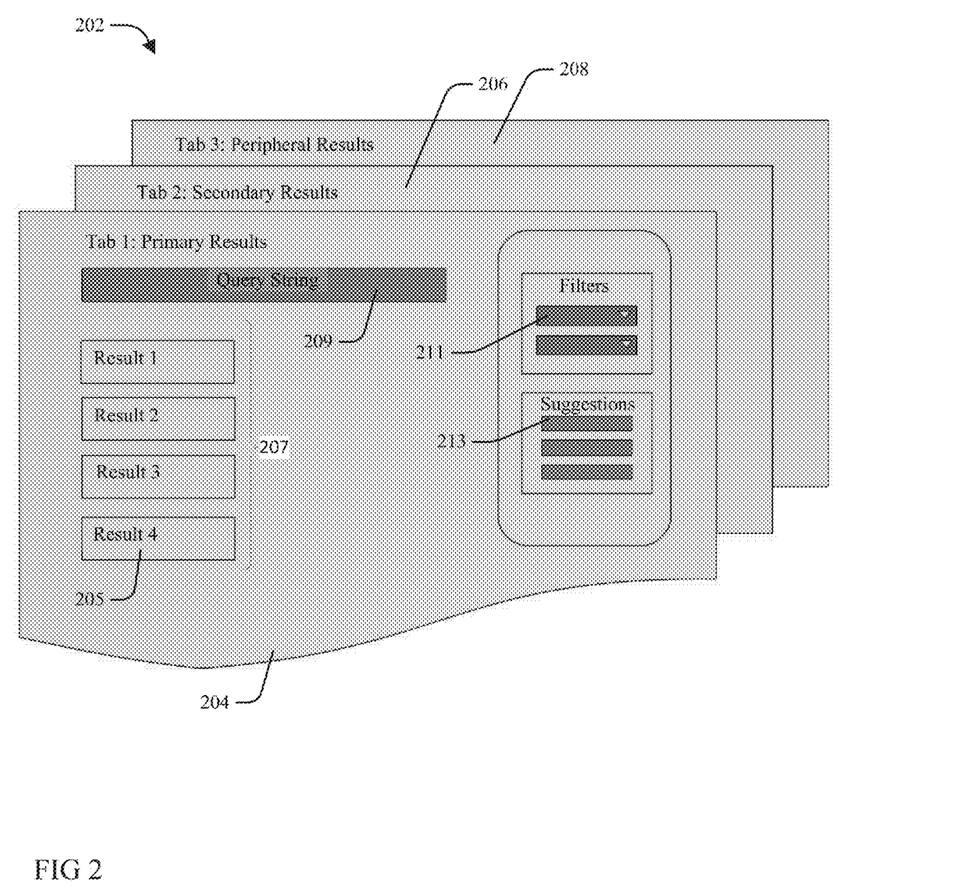
FIG. 2 is a graphic illustration of an aspect of an interface dashboard display according to the present invention.

FIG. 2 illustrates one aspect of a web-based interface dashboard display 202 as described at 120 of FIG. 1. A primary results tabbed sheet 204 includes a list 207 of the set of plurality search results 205 generated at 112 of FIG. 1, which is displayed in front of (nested on top of) a secondary results tabbed sheet 206 that lists the secondary search results generated at 116 of FIG. 1. Thus, the listing of the secondary set of search results in the secondary results tabbed sheet is behind the primary tabbed sheet and not visible to the user unless the user selects the secondary tabbed sheet. In a similar fashion, the secondary tabbed sheet 206 is also displayed in front (nested on top) of a peripheral results tabbed sheet 208 that lists the peripheral, background knowledge article results generated at 118 of FIG. 1, which is also not visible to the user unless and until the user selects the peripheral results tabbed sheet 208.

The interface dashboard display 202 enables the user to selectively navigate between the three tabs 204, 206 and 208, wherein selecting any one through a graphical user interface (GUI) cursor routine will redraw the display and bring the selected tab and its respective list of results in front, as the primary result tab 204 is presently shown in FIG. 2. Thus, the user remains on the same web page display 202, but is enabled to redraw the page 202 to present the list of primary, secondary or peripheral results that the user wishes to consider.

Aspects of the invention display the user string inquiry provided by the user (at 102, FIG. 1) in a display field. Optional search filter pull-downs 211 are provided wherein selection by the user (via a GUI routine) will cause the search string query displayed in 209 to be revised by the filter, and thereby trigger new iterations of query display within 209 and primary, secondary and peripheral results generation (at 112, 116 and 118 of FIG. 1, respectively). A plurality of query string suggestions 213 is also displayed, wherein selection by the user (via a GUI routine) will cause the search string query displayed in 209 to be replaced by the selected suggestion, and thereby trigger new iterations of query display within 209 and primary, secondary and peripheral results generation (at 112, 116 and 118 of FIG. 1, respectively).

Internet search engines generally enable individual users to find a wide variety of results in response to user-defined search terms. However, it is often the case that the results will not be satisfactory, requiring the user to follow up with one or more additional search term inputs, resulting in a series of inputs and a series of different results that may each be somehow derived from or related to the original search, in order to get more or satisfactory information. The information collected during a series of related searches in the prior art relies on the quality of the individual questions or inputs that the individual user enters. Accordingly, a series of user-generated search inputs and follow on queries may result in missing information if the individual does not use the correct terms, or does not know enough about a topic to search appropriately.

In contrast, aspects of the present invention produce and display multiple-faceted results in response to a single, individual user-defined search request. The display of the multiple-faceted results in a web-based interface dashboard display (for example, 202 of FIG. 2) organizes and presents search results in an intuitive manner that provides the user a holistic view of the search, in addition to answering the initial specific key word question or specific search entity in the primary tab (204) of results. Efficiency in retrieving search results is improved by presenting most-likely satisfactory results in a primary set, along with secondary and peripheral results that anticipate additional queries or entity searches that the end user may otherwise have, or additional information that the end user may need about the key words or entities being searched. Presentation of search results via multi-facetted tabs (for example, 204, 206 and 208) gives the user control over the priority of display, for example enabling the user to re-draw or refresh the page to feature secondary, less-likely on target results that may be of interest to the user, over the usual prioritization schema that favors most likely results over all others, as is common in the conventional display of search results.

In one example of an aspect of the present invention, a user desires to paint a deck structure, and accordingly starts looking for a suitable stain and enters a "wood deck stain" text string query at 102. In response, a dashboard display 202 of search engine results generated at 120 includes a primary results tab 204 that include precise set 207 of search results 205 (generated at 112, FIG. 1) including various types of available stains (for example, transparent, semi-transparent, solid, etc.), and/or various brands of stains available, as well as advertisement or contact information for a retail business that is able to offer these items for sale to the user. The secondary tab 206 may include a set of different but related items (generated at 116, FIG. 1) that are required to paint a deck, for example a paint brush, a deck scrubber, a deck cleaner, a power washer, etc. The peripheral tab 208 shows a set of search results (generated at 118, FIG. 1) that includes results related to the original search and that provide the user with information needed to paint a deck, for example "e-how" articles on how to paint a deck, instructional videos located on one or more video-hosting web sites that demonstrate painting a deck, product manuals on power washers, deck maintenance tips, etc.

In another example, in response to a user entry (at 102) of a "physics of helium atom" string query, the dashboard display 202 shows a primary tab 204 of search results 205 including published and formal documents and articles related to physics of a helium atom, its structure and place in the periodic table, etc. The second tab 206 shows a secondary set of different but related items that describe uses of helium in gas form, as well as in liquid and solid forms. The peripheral tab 208 shows a set of search results that includes results related to the original search and that provides the user with information describing helium-based chemical compounds.

Aspects provide improved user satisfaction via efficiency in generating, from just one search query input, a variety of different necessary or relevant information items for each of the different domains of the three tabs, rather than requiring three separate user inputs, in some examples in response to different targeted questions or item searches prompted by each previous search result in a series of search results. In contrast, prior art methodology requires a user to ask each of multiple, different key word questions or specify different or additional entities via a sequence of different searches that are each initiated by the user to get the different directly relevant, related and supporting information.

Results presented to a user in any of the tabs 204, 206 and 208 may be ranked through a variety of organizational and prioritization schema, including based on historic frequencies of selection for further searching. The number of results displayed in a tab may be predetermined or limited to a user-specified limit (for example, only displaying the top three or five secondary search results, etc.), and still other limits and displays may be practiced.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. Examples of a computer readable storage medium exclude transitory, propagation or carrier wave signals or subject matter and include an electronic, magnetic, optical or semiconductor system, apparatus, or device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is not a transitory, propagation or carrier wave signal, but instead may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic or optical forms or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
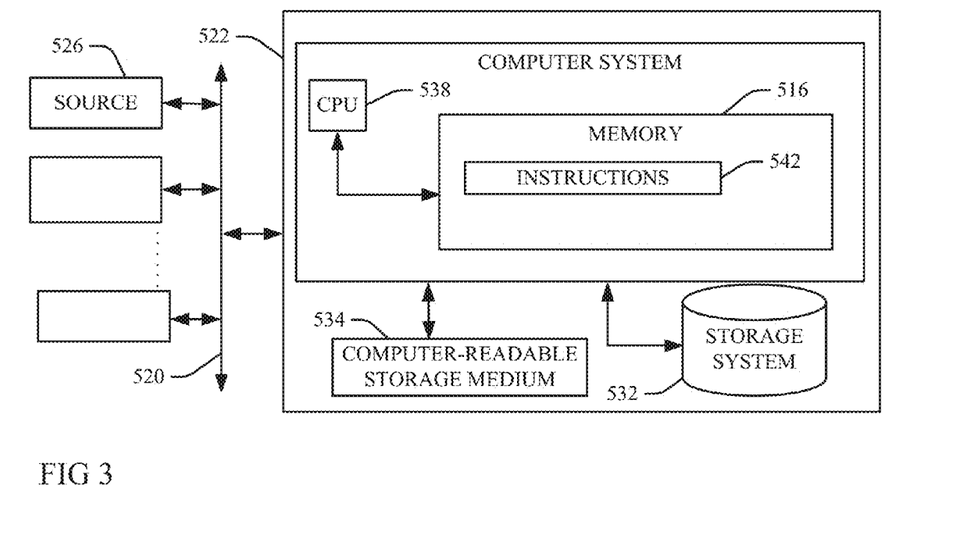
FIG. 3 is a block diagram illustration of a computer system implementation of an aspect of the present invention.

Referring now to FIG. 3, an exemplary computerized implementation of an aspect of the present invention includes a computer system or other programmable device 522 in communication with a plurality of information resources 526 (storage devices including archived data, servers, blogs, bulletin boards, directories, dictionaries, etc.) that retrieves, organizes and displays multiple-faceted results in response to a text string query as described above with respect to FIGS. 1 and 2. Instructions 542 reside within computer readable code in a computer readable memory 516, or in a computer readable storage system 532, or other tangible computer readable storage medium 534 that is accessed through a computer network infrastructure 520 by a Central Processing Unit (CPU) 538. Thus, the instructions, when implemented by the processing unit 538, cause the processing unit 538 to automatically retrieve, organize and display multiple-faceted results in response to a text string query as described above with respect to FIGS. 1 and 2.

In one aspect, the present invention may also perform process steps of the invention on a subscription, advertising, and/or fee basis. That is, a service provider could offer to integrate computer-readable program code into the computer system 522 to enable the computer system 522 to automatically retrieve, organize and display multiple-faceted results in response to a text string query as described above with respect to FIGS. 1 and 2. The service provider can create, maintain, and support, etc., a computer infrastructure, such as the computer system 522, network environment 520, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 522, from a tangible computer-readable medium device 532 or 534; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The aspect was chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various aspects of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for retrieving, organizing and displaying different classifications of sets of search results in response to a text string query, the method comprising executing on a processing unit the steps of:

retrieving search history data relevant to identity indicia of a user that is associated with a text string search query;

identifying search resources that are associated with the user identity indicia;

classifying the text string search query into constituent primary search terms as a function of the identified search resources and a language classification rule, wherein the constituent primary search terms are words or phrases;

determining as secondary search terms synonyms and antonyms of the primary search terms that are selected by users for search iterations subsequent to searches for the primary search terms at less than a threshold frequency rate;

searching network resources for the primary search terms to generate a primary set of search results;

searching the network resources for the secondary search terms to generate a secondary set of search results; and displaying the primary set of search results and the secondary set of search results in different, respective tabbed sheets that are nested on top of one another in a web-based interface dashboard.

2. The method of claim 1, further comprising:
retrieving a set of peripheral knowledge article results via searching knowledge article resources for articles that comprise background information on the primary search terms or the secondary search terms; and
displaying the set of peripheral knowledge articles in a tabbed peripheral knowledge sheet that is nested on top of one another, relative to the different respective tabbed sheets of the primary set of search results and the secondary set of search results, in the web-based interface dashboard.

3. The method of claim 1, wherein the threshold frequency rate is 20%.

4. The method of claim 1, further comprising:
integrating computer-readable program code into a computer system comprising the processing unit, a computer readable memory and a computer readable tangible storage medium, wherein the computer readable program code is embodied on the computer readable tangible storage medium and comprises instructions for execution by the processing unit via the computer readable memory that cause the processing unit to perform the steps of retrieving the search history, identifying the search resources, classifying the text string search query into the constituent primary search terms, determining the secondary search terms, searching network resources for the primary search terms to generate the primary set of search results, searching the network resources for the secondary search terms to generate the secondary set of search results, and displaying the search results in the different, respective tabbed sheets.

5. The method of claim 1, wherein the retrieved search history data comprises unique user search history data that is associated with identity indicia that is unique to the user, and generic occupational identity search data that is associated with occupational identity indicia that is common to the user and at least one other user having common same occupational identity indicia; and
wherein the step of classifying the text string search query into the constituent primary search terms comprises weighting classifications determined as a function of the unique user search history data more highly than classifications determined as a function of the generic occupational identity search data, and weighting classifications determined as a function of the generic occupational identity search data more highly than any classifications generated by application of universal search history popularities common to all user histories.

6. The method of claim 5, further comprising:
identifying the generic occupational identity search data that is associated with occupational identity indicia that is common to the user and at least one other user having the common occupational identity indicia by:
recognizing a type of network access used by the user to submit the text string query;
determining a predominant occupational identity associated with the recognized type of network access; and
retrieving search history common to pluralities of users that share the determined predominant occupational identity as the generic occupational identity search data.

7. The method of claim 6, wherein the recognizing the type of network access used by the user to submit the text string query comprises:
recognizing that entry of the search string is via a secure network community portal or a specific domain name, wherein the secure network community portal or the specific domain name are associated with users having the predominant occupational identity.

8. The method of claim 6, wherein the recognizing the type of network access used by the user to submit the text string query comprises:
recognizing an industry-specific internet content adaptation protocol content associated with the text string query, wherein the industry-specific internet content adaptation protocol content is associated with users having the predominant occupational identity.

9. A system, comprising:
a processing unit;
a computer readable memory in communication with the processing unit; and
a computer-readable storage medium in communication with the processing unit;
wherein the processing unit executes program instructions stored on the computer-readable
storage medium via the computer readable memory and thereby:
retrieves search history data that is relevant to identity indicia of a user that is associated with a text string search query;
identifies search resources that are associated with the user identity indicia;
classifies the text string search query into constituent primary search terms as a function of the identified search resources and a language classification rule, wherein the constituent primary search terms are words or phrases;
determines as secondary search terms synonyms and antonyms of the primary search terms that are selected by users for search iterations subsequent to searches for the primary search terms at less than a threshold frequency rate;
searches network resources for the primary search terms to generate a primary set of search results;
searches the network resources for the secondary search terms to generate a secondary set of search results; and
displays the primary set of search results and the secondary set of search results in different, respective tabbed sheets that are nested on top of one another in a web-based interface dashboard.

10. The system of claim 9, wherein the processing unit executes the program instructions stored on the computer-readable storage medium via the computer readable memory and thereby:
retrieves a set of peripheral knowledge article results via searching knowledge article resources for articles that comprise background information on the primary search terms or the secondary search terms; and
displays the set of peripheral knowledge articles in a tabbed peripheral knowledge sheet that is nested on top of one another, relative to the different respective tabbed sheets of the primary set of search results and the secondary set of search results, in the web-based interface dashboard.

11. The system of claim 9, wherein the retrieved search history data comprises unique user search history data that is associated with identity indicia that is unique to the user, and generic occupational identity search data that is associated with occupational identity indicia that is common to the user and at least one other user having common same occupational identity indicia; and wherein the processing unit executes the program instructions stored on the computer-readable storage medium via the computer readable memory and thereby classifies the text string search query into the constituent primary search terms by weighting classifications determined as a function of the unique user search history data more highly than classifications determined as a function of the generic occupational identity search data, and weighting classifications determined as a function of the generic occupational identity search data more highly than any classifications generated by application of universal search history popularities common to all user histories.

12. The system of claim 11, wherein the processing unit executes the program instructions stored on the computer-readable storage medium via the computer readable memory and thereby further identifies the generic occupational identity search data that is associated with occupational identity indicia that is common to the user and at least one other user having the common occupational identity indicia by:

recognizing a type of network access used by the user to submit the text string query;

determining a predominant occupational identity associated with the recognized type of network access; and retrieving search history common to pluralities of users that share the determined predominant occupational identity as the generic occupational identity search data.

13. The system of claim 12, wherein the processing unit executes the program instructions stored on the computer-readable storage medium via the computer readable memory and thereby recognizes the type of network access used by the user to submit the text string query by recognizing that entry of the search string is via a secure network community portal or a specific domain name, wherein the secure network community portal or the specific domain name are associated with users having the predominant occupational identity.

14. The system of claim 12, wherein the processing unit executes the program instructions stored on the computer-readable storage medium via the computer readable memory and thereby recognizes the type of network access used by the user to submit the text string query by recognizing an industry-specific internet content adaptation protocol content associated with the text string query, wherein the industry-specific internet content adaptation protocol content is associated with users having the predominant occupational identity.

15. A computer program product for retrieving, organizing and displaying different classifications of sets of search results in response to a text string query, the computer program product comprising:

a computer readable hardware storage device having computer readable program code embodied therewith, wherein the computer readable storage medium is not a transitory signal per se, the computer readable program code comprising instructions for execution by a computer processing unit that cause the computer processing unit to:

retrieve search history data that is relevant to identity indicia of a user that is associated with a text string search query;

identify search resources that are associated with the user identity indicia;

classify the text string search query into constituent primary search terms as a function of the identified search resources and language, wherein the constituent primary search terms are words or phrases;

determine as secondary search terms synonyms and antonyms of the primary search terms that are selected by users for search iterations subsequent to searches for the primary search terms at less than a threshold frequency rate;

search network resources for the primary search terms to generate a primary set of search results;

search the network resources for the secondary search terms to generate a secondary set of search results; and display the primary set of search results and the secondary set of search results in different, respective tabbed sheets that are nested on top of one another in a web-based interface dashboard.

16. The computer program product of claim 15, wherein the computer readable program code instructions for execution by the computer processing unit further cause the computer processing unit to:

retrieve a set of peripheral knowledge article results via searching knowledge article resources for articles that comprise background information on the primary search terms or the secondary search terms; and display the set of peripheral knowledge articles in a tabbed peripheral knowledge sheet that is nested on top of one another, relative to the different respective tabbed sheets of the primary set of search results and the secondary set of search results, in the web-based interface dashboard.

17. The computer program product of claim 15, wherein the retrieved search history data comprises unique user search history data that is associated with identity indicia that is unique to the user, and generic occupational identity search data that is associated with occupational identity indicia that is common to the user and at least one other user having common same occupational identity indicia; and wherein the computer readable program code instructions for execution by the computer processing unit further cause the computer processing unit to classify the text string search query into the constituent primary search terms by weighting classifications determined as a function of the unique user search history data more highly than classifications determined as a function of the generic occupational identity search data, and weighting classifications determined as a function of the generic occupational identity search data more highly than any classifications generated by application of universal search history popularities common to all user histories.

18. The computer program product of claim 17, wherein the computer readable program code instructions for execution by the computer processing unit further cause the computer processing unit to identify the generic occupational identity search data that is associated with occupational identity indicia that is common to the user and at least one other user having the common occupational identity indicia by:

recognizing a type of network access used by the user to submit the text string query;

determining a predominant occupational identity associated with the recognized type of network access; and retrieving search history common to pluralities of users that share the determined predominant occupational identity as the generic occupational identity search data.

19. The computer program product of claim 17, wherein the computer readable program code instructions for execution by the computer processing unit further cause the computer processing unit to recognize the type of network access used by the user to submit the text string query by recognizing that entry of the search string is via a secure network community portal or a specific domain name, wherein the secure network community portal or the specific domain name are associated with users having the predominant occupational identity.

20. The computer program product of claim 17, wherein the computer readable program code instructions for execution by the computer processing unit further cause the computer processing unit to recognize the type of network access used by the user to submit the text string query by recognizing an industry-specific internet content adaptation protocol content associated with the text string query, wherein the industry-specific internet content adaptation protocol content is associated with users having the predominant occupational identity.

* * * * *